United States Patent [19]

Larker

[11] 4,172,807
[45] Oct. 30, 1979

[54] METHOD FOR ANCHORING RADIOACTIVE SUBSTANCES IN A BODY RESISTANT TO LEACHING BY WATER

[75] Inventor: Hans Larker, Robertsfors, Sweden

[73] Assignee: ASEA AS, Västerås, Sweden

[21] Appl. No.: 847,090

[22] Filed: Oct. 31, 1977

[30] Foreign Application Priority Data

Nov. 2, 1976 [SE] Sweden .................................. 7612146

[51] Int. Cl.² .............................................. G21F 9/34
[52] U.S. Cl. ............................... 252/301.1 W; 75/226; 264/0.5
[58] Field of Search ................. 252/301.1 W; 264/0.5; 75/226

[56] References Cited

U.S. PATENT DOCUMENTS

| | | | |
|---|---|---|---|
| Re. 28,301 | 1/1975 | Havel | 75/226 |
| 3,000,072 | 9/1961 | Evans | 252/301.1 W |
| 3,262,885 | 7/1966 | Rushbrook | 252/301.1 W |

OTHER PUBLICATIONS

Bonniaud, R. et al., "Attempt at Incorporating Concentrated Solutions of Fission Products in Glasses and Micas", *Proc. 2nd Int'l. Conf. on Peaceful Uses of Atomic Energy*, Geneva, 1958, pp. 33-36.
"HIP to Process Nuclear Waste", *Metal Powder Report*, vol. 32, No. 3, Mar. 1977, p. 98.

*Primary Examiner*—Richard D. Lovering
*Assistant Examiner*—Deborah L. Kyle
*Attorney, Agent, or Firm*—Watson, Cole, Grindle & Watson

[57] ABSTRACT

Disclosed is a method for containing high-level radioactive waste in a body resistant to leaching by water. The method includes the steps of providing a mass containing radioactive substances and either a material which is resistant to leaching by water or a material which when heated forms a material resistant to leaching by water, enclosing the mass in a capsule, and then isostatically pressing the capsule at a temperature and pressure sufficient to form a coherent, dense body from the mass.

19 Claims, 2 Drawing Figures

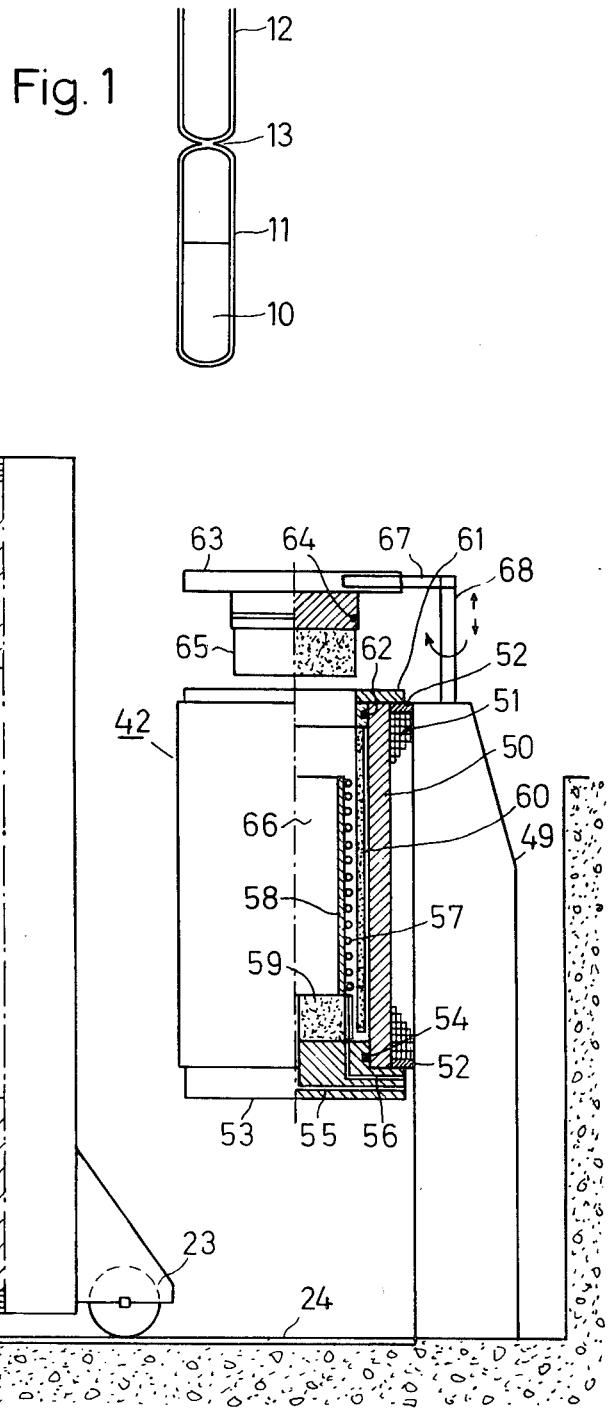

METHOD FOR ANCHORING RADIOACTIVE SUBSTANCES IN A BODY RESISTANT TO LEACHING BY WATER

BACKGROUND OF THE INVENTION

In present day reprocessing of radioactive waste from nuclear reactors, the high-level waste is obtained in a strong nitric acid solution. The predominant radioactive substances in the waste during the first centuries are strontium-90 and cesium-137. The waste also contains, among other things, minor amounts of uranium, plutonium and transuranic elements which have considerably greater half-lives than strontium-90 and cesium-137. Those skilled in the art are generally of the opinion that it is advantageous, after a suitable period of cooling, to convert the liquid high-level waste into a solid product of good chemical resistance which is stable to leaching out of the contained radioactive substances by water and which is able to withstand heating produced by the fission products and stresses during management and transportation of the product. Materials that have been proposed for use in containing the waste include glasses such as boron silicate glass and phosphate glass, quartz, titanium dioxide, certain zeolites and other minerals existing in nature, particularly those having the ability to retain gases.

In a known method of containing high-level waste in glass, the waste is evaporated, calcined and additives are added thereto which, when heated to 1000°–1200° C., result in a glass melt. Calcination of high-level waste may take place at a temperature of the order of magnitude of 300°–500° C. and results in the waste products being transformed into oxides. The melt is poured into tight steel containers which are then transferred to a cooled and supervised storage plant.

SUMMARY OF THE INVENTION

The present invention is directed to a method of containing high-level waste which allows for an extremely efficient and controllable management of the waste during the process of containment as well as an efficient containment in a resistant material. When the high-level waste has been isolated from the solution, which may, for example, take place in conventional manner by evaporation, possibly followed by calcination, according to the present invention the high-level waste is confined in a capsule at all times during the containment process, and neither gaseous nor liquid products are able to escape from this capsule. This confinement is obtained by sealing the capsule and subjecting the capsule to a hot-isostatic pressing. The isostatic pressure counteracts the formation of volatile constituents in the waste material contained in the capsule during the heating that is required for the contained material to be transformed into a coherent, tight unit, while at the same time achieving the necessary compression of the material. Another important advantage of the method is that it allows enclosing the material in a capsule when the material is at room temperature. A further important advantage of the invention is that it affords great freedom in choosing resistant materials for the containment of the high-level waste material.

More particularly, the present invention is directed to a method of anchoring radioactive substances, particulary radioactive substances present in high-level radioactive waste, in a body which is resistant to leaching by water. The method comprises providing a mass containing radioactive substances and either materials which are resistant to leaching by water or materials which, when heated, form materials resistant to leaching by water, enclosing the mass in a capsule, isostatically pressing the capsule at a pressure and a temperature sufficient for the formation of a coherent, tight body of the mass. The capsule is preferably evacuated prior to sealing.

Further advantages and features of the invention will become more apparent from a detailed consideration of the particular embodiments as set forth in the following specification in conjunction with the accompanying drawing.

BRIEF DESCRIPTION OF THE DRAWINGS

In the drawing,

FIG. 1 shows a capsule containing a mixture of high-level waste and resistant material, and FIG. 2 shows a high-pressure furnace in which the pressing and sintering of the mixture are performed.

DESCRIPTION OF THE PREFERRED EMBODIMENTS

According to one embodiment of the method of the present invention, particles of a radioactive substance are mixed with particles of a material resistant to leaching by water so as to form a mass which is then enclosed in a capsule and subjected to isostatic pressing at a pressure and temperature required for the formation of a coherent, tight body of the mass.

The material resistant to leaching by water may advantageously be composed of oxides of the types normally contained in glasses of various kinds and in rocks, examples of which include $SiO_2$, $B_2O_3$, $MgO$, alkaline oxides, alkaline earth oxides, $TiO_2$, $ZrO_2$, $Fe_2O_3$, $Fe_3O_4$ and $Cr_2O_3$. Further, the material may, among other things, consist of rocks existing in nature which are well-known for their long-term stability, for example, rocks composed of silicates, aluminates, chromates and titanates. Rocks with the ability to retain gases may be of special interest, as well as zeolites with the ability to selectively take up strontium and cesium from a solution. In addition, glasses such as boron silicate glass and phosphate glass may be used. Preferred materials include aluminum oxide, titanium oxide, quartz and rocks existing in nature.

The particle size of the radioactive substance and of the leach resistant material is preferably below 325 mesh. Of the total weight of radioactive substances and resistant material in the mixture, the weight of radioactive substances constitutes preferably 15–40 percent and the weight of resistant material preferably 60–85 percent.

According to another embodiment of the method of the present invention, a particulate mass containing a material resistant to leaching by water in which the radioactive substances are fixed or a material in which the radioactive substances are fixed and which upon heating forms a material resistant to leaching by water is enclosed in a capsule and then subjected to isostatic pressing at a pressure and temperature sufficient for the formation of a coherent, tight body of the mass.

The material resistant to leaching by water in which the radioactive substances are fixed may, among other things, be insoluble salts or other insoluble compounds of the radioactive substances such as titanates, aluminates, phosphates, silicates and oxides. The salts or the other insoluble compounds may, among other things, be precipitated from solutions containing radioactive substances by adding corresponding soluble salts. The particles of the resistant material suitably have a size of below 1 mm.

The material in which the radioactive substances are fixed and which upon heating forms a material resistant to leaching by water may, among other things, be ion exchange materials which have taken up the radioactive substances through ion exchange upon contact with a solution containing the radioactive substances. A suitable size of the particles of the ion exchange material is from 0.1 to 1 mm. Examples of ion exchange materials which may be used for taking up radioactive substances are, among other things, zeolites and compounds with the formula $M [M'_xO_yH_z]_n$, where M is an exchangeable cation of the charge $+n$ and $M'$ may be Ti, Nb, Zr or Ta, for example $NaTi_2O_5H$. Ion exchange materials which have taken up radioactive substances, upon heating, normally form multi-phase polycrystalline, ceramic materials which are resistant to leaching by water. For example, upon contact with a solution containing radioactive strontium, $NaTi_2O_5H$ forms $Sr[Ti_2O_5H]_2$ which, when heated, is broken down into $SrTiO_3$ and $TiO_2$.

According to this second embodiment, one or more materials resistant to leaching by water other than those in which radioactive substances are fixed and those which are formed during the heating previously mentioned, respectively, may be incorporated in the particulate mass. Examples of such other resistant material include oxides of such kinds as are normally comprised in glasses of various kinds and different rocks, such as, for example, $SiO_2$, $B_2O_3$, $Al_2O_3$, MgO, alkaline oxides, alkaline earth oxides, $TiO_2$, $ZrO_2$, $Fe_2O_3$ and $Cr_2O_3$, and further rocks existing in nature which are well-known for their long-term stability, such as rocks composed of silicates, aluminates, phosphates and titanates. Preferred materials include aluminum oxide, titanium oxide, quartz and rocks existing in nature. The mentioned resistant materials may also be added to materials which are brought into contact with the radioactive substances and in which the radioactive substances are then fixed. Thus, the resistant materials may be mixed with ion exchange materials before the ion exchange materials are brought into contact with the radioactive substances so as to reduce the management of radioactive substance. A suitable amount of resistant material incorporated in the particle mass may be 1-95 percent of the total weight of the particle mass and the incorporated material. The particles of the incorporated resistant material suitably have a size of less than 1 mm and preferably of less than 0.5 mm.

The capsule may, among other things, consist of sheets of tantalum, titanium, zirconium, alloys based on these metals such as, for example, zirconium based alloys sold under the tradename Zircaloy, steel, iron, nickel and further of quartz glass or boron silicate glass. The capsule material should be matched to the resistant material so that it has a sufficiently high melting point for the capsule to fulfil its duties, and substantially the same coefficient of thermal expansion in such cases when the capsule is left to provide a reinforced containment. With quartz or titanium oxide as resistant material, quartz glass is preferred for use in the capsule, and with boron silicate glass as resistant material, a capsule of the same material is preferred. In certain cases it may be suitable to use a capsule of metal which is internally provided with a layer of quartz glass or boron silicate glass.

Between the capsule and the mass to be contained it may be suitable to arrange an intermediate layer of a resistant material such as any of the previously exemplified resistant materials. It may be particularly suitable to use a material of the same chemical composition as the mass but without radioactive isotopes as the intermediate layer. The particles in the material in the intermediate layer suitably have a size of less than 1 mm and preferably less than 0.2 mm. The intermediate layer may, for example, be applied as a layer of a thickness of a few mm or cm on the inner wall of the capsule.

The pressure during the isostatic pressing amounts to at least 10 MPa and is preferably between 50 and 300 MPa. The temperature is, of course, dependent on what materials are included in the particulate mass but is at least 700° C. A suitable temperature for particulate masses containing titanates, quartz or titanium dioxide is 1200°–1300° and for particulate masses containing aluminates and aluminum oxides is 1250° C.–1350° C.

Turning now to FIG. 1 of the drawing, shown is one embodiment of the capsule 11 which may be used in the method of the present invention. The capsule 11 confines particulate mass 10 and includes opening 12 which is closed by fused portion 13.

In FIG. 2, displaceable press stand 22 includes wheels 23 running on rails 24 on floor 25. The press stand 22 is of the type which consists of an upper yoke 26, a lower yoke 27 and a pair of spacers 28 which are held together by a prestressed strip sheath 29. The press stand 22 is movable between the position shown in FIG. 2 and a position where the stand surrounds high-pressure chamber 42. The high-pressure chamber 42 is supported by a column 49 and contains a high-pressure cylinder which includes an inner tube 50, a surrounding prestressed strip sheath 51 and end rings 52 which axially hold together the strip sheath and constitute a suspension device by which the high-pressure chamber is attached to column 49. The chamber 42 has a lower end closure 53 projecting into the tube 50 of the high-pressure cylinder. In the end closure there is a slot in which there are arranged a sealing ring 54, a channel 55 for the supply of a pressure medium, preferably argon or helium, and a channel 56 for cables for feeding heating elements 57 for the heating of the chamber 42. The heating elements 57 are supported by a cylinder 58 resting on an insulating bottom 59, which protrudes into an insulating sheath 60. The upper end closure comprises an annular portion 61 with a sealing ring 62 which seals against the tube 50. The sheath 60 is suspended from portion 61 and gastightly connected thereto. The end closure also comprises a lid 63 for closing the opening in portion 61, which is usually permanently mounted in the high-pressure cylinder. The lid 63 is provided with a sealing ring 64 sealing against the inner surface of portion 61 and with an insulating lid 65 which, when the high-pressure chamber is closed, projects into cylinder 60 and constitutes part of the insulating shell which surrounds the furnace space 66. The lid 63 is fastened to a bracket 67 which is carried by a raisable, lowerable and rotatable operating rod 68. Yokes 26 and 27 take up the compressive forces acting on end closure 53 and lid 63 when pressure is applied to the furnace space 66.

The invention will be explained in greater detail by way of examples with reference to the accompanying drawing.

EXAMPLE 1

25 parts by weight of high-level waste from a plant for reprocessing waste from a nuclear reactor, the waste having been converted into oxides in conventional manner and having a particle size of less than 80 mesh, is mixed with 75 parts by weight of quartz powder having a particle size of less than 100 mesh. The quartz was treated in vacuum to remove dissolved gasses prior to mixing. The mixture 10 is placed in a capsule 11 of Vycor glass which, to 96 percent by weight, consists of quartz and which is considered to fall under the concept quartz glass as used in this application. When the mixture 10 is introduced into the capsule 11, the capsule has no indentation 13 as is shown in FIG. 1. The capsule 11 is degassed at room temperature to a pressure of 0.1 Pa with a vacuum pump connected to the opening 12. The capsule 11 is then sealed at this pressure by fusing the capsule at 13.

The capsule is placed in the furnace space 66, the lid 63 first having been lifted up and then lowered for closing the furnace space, and then the pressure and the temperature are successively increased to around 200 MPa and about 1200° C., respectively, and are maintained at these values for about two hours, when the desired density and sintering have been obtained. The capsule 11 with the enclosed material is then allowed to cool, whereafter the pressure is reduced to atmospheric pressure and the capsule is removed from the furnace. The capsule 11 is allowed to remain as reinforcement for the material. The capsule 11 may be transported for permanent storage possibly enclosed in a steel container (not shown).

EXAMPLE 2

A waste solution from a plant for reprocessing of high-level waste from a nuclear reactor is treated by the method of this invention. The solution consists of a 2-molar nitric acid solution and contains in the form of radioactive substances 7.0 g/l Zr, 6.9 g/l Mo, 8.0 g/l Nd, 4.5 g/l Ru, 5.4 g/l Cs, 4.8 g/l Ce, 3.8 g/l Fe, 3.1 g/l Pd, 3.3 g/l Ba, 1.5 g/l Sr, 2.5 g/l La, 2.3 g/l Pr, 2.3 g/l Am, 12.6 g/l U, 23.8 g/l Gd and various other radioactive substances in lesser amounts. The pH of the solution is adjusted to around 1 by adding ammonia. The solution is then passed through a cylindrical column of titanium containing an ion exchange material consisting of $NaTi_2O_5H$ in the form of particles with a size of from 0.1 to 1 mm. The ion exchange material is mixed with the same quantity by weight of particles of $TiO_2$ having a size of from 0.1 to 0.5 mm. The solution is then passed through a second cylindrical column of titanium containing an ion exchange material consisting of a zeolite of the formula $Na_8Al_8Si_{40}O_{96}.24H_2O$. This ion exchange material also consists of particles of a size of from 0.1 to 1 mm.

The water content of the two columns is removed by heating to around 900° C. under vacuum. The ion exchange materials are then at least partially decomposed which leads to the formation of titanate containing radioactive substances and titanium dioxide in the first column.

Each column with its contents is then placed in a cylindrical capsule of low carbon steel having a bottom and is then embedded in titanium dioxide powder having a particle size of less than 0.2 mm so that the spaces between the capsule and the column around the envelope surface of the column as well as above the column top and below the bottom are filled with the titanium dioxide powder. The titanium dioxide powder will also fill any spaces in the column which are accessible to the powder. Each capsule is then provided with a tightly fitting lid with an evacuation opening. After evacuation of each capsule at a pressure of 0.1 Pa and subsequent closing of the evacuation opening, each capsule with its contents is placed in a high-pressure furnace as shown in FIG. 2. When the capsules have been placed in the furnace space and the furnace space has been sealed, the pressure and the temperature in the furnace space are increased to around 100 MPa and about 1300° C., respectively, and are maintained at these values for about two hours, when the desired density and sintering of the formed body is obtained. The capsules with the enclosed material are then allowed to cool, whereafter the pressure is reduced to atmospheric pressure and the capsules removed from the furnace. Each capsule is allowed to remain as reinforcement for the body.

EXAMPLE 3

An 0.9 molar nitric acid solution containing in the form of radioactive substances 1.17 g/l $(NH_4)_6Mo_7O_{24}.4H_2O$, 3.75 g/l $Nd(NO_3)_3.6H_2O$, 0.59 g/l $CsNO_3$, 1.23 g/l $Ce(NO_3)_3.6H_2O$, 2.80 g/l $Fe(NO_3)_3.9H_2O$, 0.57 g/l $UO_2(NO_3)_2.6H_2O$, and 0.63 g/l Ni $(NO_3)$ is treated by the present method. The pH of the solution is adjusted to 1.3 by the addition of NaOH. The solution is then passed through a cylindrical column containing an ion exchange material consisting of $NaTi_2O_5H$ in the form of particles having a size of 0.1 to 1 mm. The ion exchange material is mixed with the same amount of a mixture of $TiO_2$, $SiO_2$ and $Al_2O_3$ having a grain size of 0.05 to 0.5 mm. The capacity of the ion exchange material corresponds approximately to 2.5% of the adsorbed waste calculated as oxide on dried ion exchange material. The ion exchange material is thereafter heated in air at 600° C. and ground into a fine powder. The powder mixture is then packed in a capsule of iron having a tightly-fitting lid with an evacuation opening. After evacuating for 24 hours at a pump pressure of 0.1 Pa and heating to 750° C., the capsule with the pump connected is sealed. The capsule is then placed in a high-pressure furnace as shown in FIG. 2 and the furnace space closed. The pressure is then raised to 150 MPa and the temperature to 1300° C., and these conditions are maintained for two hours. The capsule with the enclosed material is then allowed to cool, whereafter the pressure is reduced to atmospheric pressure and the capsule is removed from the furnace. The contents of the capsule constitute a dense body without pores and voids and contain different crystalline phases, amoung other things $TiO_2$, $NaTiO_3$ and $Al_2TiO_5$, so that the radioactive substances are fixed in a water-insoluble state.

EXAMPLE 4

A waste solution from a plant for reprocessing high-level waste from a nuclear reactor is treated. The solution consists of a 2-molar nitric acid solution and contains in the form of radioactive substances, among other things, 60.5 g/l Nd, 5.9 g/l [$PO_4^{3-}$], 10.6 g/l Cs, 11.5 g/l Mo, 10.5 g/l Sr, 10.0 g/l Zr, 5.1 g/l Fe and 0.3 g/l Ni. 7.2 g/l Ca and 2.2 g/l Al in the form of nitrates as well as 65 g of finely-divided $SiO_2$ (grain size 100 Angstrom) are added to said solution. The solution is evaporated and then calcined in air for one hour at 500° C. Thereafter, 60 parts by weight of calcine are mixed with 40 parts by weight of α-Al$_2$O$_3$ by grinding in a ball mill. The mixture is then heated in air for two hours at 900° C., remainders of nitrates and water then being driven off. The mixture is packed in a cylindrical capsule of iron which has a tightly-fitting lid with an evacuation opening. The capsule is evacuated for 24 hours at a pressure of 0.1 Pa at the pump and heated to 750° C. and is thereafter sealed with the pump connected. When the capsule has been placed in a high pressure furnace as shown in FIG. 2 and the furnace space has been sealed, the pressure is raised to 150 MPa and the temperature to 1300° C., and these conditions are maintained for seven hours. The capsule and the enclosed material are then allowed to cool, whereafter the pressure is reduced to atmospheric pressure and the capsule is removed from the furnace. The contents of the capsule constitute a dense body without pores and voids and with a density of 4.82 g/lcm$^3$. The body contains different crystalline phases, among other things a phase of corundum type, (AlFe)$_2$O$_3$, a phase of fluorite type, (Zr, Ca, Nd)O$_2$, a phase of pollucite type CsAlSi$_2$O$_6$, a phase of scheelite type, (Sr Ca) MoO$_4$, and a phase of apatite type (Ca Nd)$_{10}$(SiO$_4$, PO$_4$, AlO$_4$)$_6$O$_2$, in which the radioactive substances are fixed. A SEM-analysis of elements Cs, Sr and Nd shows that these elements are very evenly distributed in the body.

EXAMPLE 5

The waste solution described in Example 4 is treated with formic acid at a temperature of 90° C., whereby the nitrates are decomposed in accordance with the formula $2NO_3^- + 4HCOOH \rightarrow N_2O + 4CO_2 + 3H_2O + 20H^-$, and whereby metal oxides and metal hydroxides are precipitated. After drying, the precipitated substances are mixed with Al$_2$O$_3$, placed in a capsule and then subjected to isostatic pressing in the manner described in the preceding example.

The method according to the invention may be utilized not only for treatment of high-level waste from the reprocessing of nuclear reactor fuel, but for other treatments as well. It is also possible to use the method for treatment of high-level waste in connection with fuel reprocessing for the manufacture of plutonium for nuclear weapons, as well as for treatment of other radioactive substances for anchoring the radioactive material in a resistant body.

Rock may be defined for the purpose of the present invention as a natural aggregation of mineral matter found in the crust of the earth.

While there has been shown and described what is considered to be preferred embodiments of the present invention, it will be obvious to those skilled in the art that various changes and modifications may be made therein without departing from the invention as defined in the appended claims.

I claim:

1. A method for anchoring radioactive waste from nuclear fuel in a body resistant to leaching by water comprising providing a mass containing radioactive substances and either a material which is resistant to leaching by water or a material which, when heated, forms a material resistant to leaching by water, enclosing the mass in a gas and liquid impervious capsule and isostatically pressing at a pressure and temperature sufficient for the formation of a coherent, dense body of the mass.

2. A method according to claim 1, wherein particles of a radioactive material are mixed with particles of a material resistant to leaching by water to form the mass.

3. A method according to claim 2, wherein the material resistant to leaching consists of a material containing one or more oxides.

4. A method according to claim 3, wherein the material resistant to leaching consists of aluminum oxide.

5. A method according to claim 2, wherein the material resistant to leaching consists of quartz.

6. A method according to claim 3, wherein the material resistant to leaching consists of titanium dioxide.

7. A method according to claim 2, wherein the material resistant to leaching consists of rock existing in nature, such as a silicate.

8. A method according to claim 1, wherein the mass includes a material in which the radioactive substances are fixed.

9. A method according to claim 8, wherein the mass contains compounds of radioactive substances which are resistant to leaching by water.

10. A method according to claim 8, wherein the mass contains a material obtained by heating an ion exchange material in which the radioactive substances are fixed.

11. A method according to claim 10, wherein the ion exchange material consists of a zeolite.

12. A method according to claim 10, wherein the ion exchange material consists of a titanate.

13. A method according to claim 8, wherein the mass contains material resistant to leaching by water in addition to material in which the radioactive substances are fixed.

14. A method according to claim 13, wherein the additional material resistant to leaching by water consists of a material containing one or more oxides.

15. A method according to claim 1 wherein the capsule consists of metallic material.

16. A method according to claim 1 wherein the capsule consists of quartz glass.

17. A method according to claim 1 wherein the capsule consists of boron silicate glass.

18. A method according to claim 1 wherein the pressure during the isostatic pressing is at least 10 MPa.

19. A method according to claim 1 wherein the temperature during the isostatic pressing is at least 700° C.

* * * * *